United States Patent [19]

Votava, III et al.

[11] Patent Number: 5,006,230

[45] Date of Patent: Apr. 9, 1991

[54] DUAL-ACTION AQUARIUM FILTER

[76] Inventors: Paul Votava, III, 4723 Hamilton St., San Diego, Calif. 92116; Daniel K. Mojonnier, P.O. Box 1005, Encinitas, Calif. 92024

[21] Appl. No.: 333,417

[22] Filed: Apr. 3, 1989

[51] Int. Cl.[5] .......................... E04H 4/00; C02F 1/24
[52] U.S. Cl. .................................... 210/94; 210/151; 210/169; 210/221.1; 210/416.2; 119/5
[58] Field of Search ............... 210/94, 169, 221.1, 210/416.2, 151; 209/163, 169; 119/5

[56] References Cited

U.S. PATENT DOCUMENTS

| | | | |
|---|---|---|---|
| 3,301,779 | 1/1967 | Kovacs | 210/222.1 |
| 3,616,919 | 11/1971 | Feddern | 210/169 |
| 3,661,262 | 5/1972 | Sanders | 210/169 |
| 3,775,311 | 11/1973 | Mook et al. | 210/704 |
| 3,994,811 | 11/1976 | Cohen et al. | 210/169 |
| 4,043,299 | 8/1977 | Birkbeck | 210/169 |
| 4,333,829 | 6/1982 | Walther | 210/169 |
| 4,585,557 | 4/1986 | Turnquist | 210/320 |
| 4,606,821 | 8/1986 | D'Imperio | 210/416.2 |
| 4,684,462 | 8/1987 | Augustyniak | 210/169 |
| 4,834,872 | 5/1989 | Overath | 210/151 |
| 4,844,013 | 7/1989 | de Hann et al. | 119/5 |

Primary Examiner—W. Gary Jones
Assistant Examiner—Matthew O. Savage
Attorney, Agent, or Firm—Poms, Smith, Lande & Rose

[57] ABSTRACT

An aquarium water filtration means includes intake means for aquarium water, prefilter means, and water transfer means for transferring aquarium water from the intake means to the prefilter means. Both mechanical and froth filtration of the aquarium water is carried out in the prefilter, which comprises a plurality of chambers separated by walls of different heights. The aquarium water is gravity fed into and through the prefilter, and between the various chambers of the prefilter, its flow being determined by the relative heights of the separating walls, as well as by the heights of openings in certain of the walls.

11 Claims, 2 Drawing Sheets

DUAL-ACTION AQUARIUM FILTER

FIELD OF THE INVENTION

The present invention relates to a water filter, in particular, to a filter for removing dissolved organic impurities and particulate matter from aquarium water.

BACKGROUND OF THE INVENTION

The health of marine animals and plants kept in aquariums depends primarily on the cleanliness and oxygenation of the water. Examples of impurities which commonly degrade the aquarium environment are those in the form of suspended solids, such as fish feces and uneaten food, and those which are liquid or dissolve in the water, such as dissolved protein and ammonia from urea. All such impurities affect the desired chemical balance of the water; in particular, the rate of rise of the nitrate concentration of the water will affect the environment, and determines to a great extent the frequency with which the water must be changed. Accordingly, a great number of products for filtering and treating aquarium water have been developed.

In the simplest and most common filtering systems, the aquarium water is passed through one or a series of mechanical filters which trap particulate impurities. Such mechanical filters may for example comprise layers of sand, ground stone or coral, plastic beads, etc. For increasing the ease and convenience of changing the filter medium, filter pads made of a porous, fibrous or water permeable material are also used, either instead of or in addition to the filter layers of sand, etc. An obvious shortcoming of these systems is that they are poor at filtering out particulate matter significantly smaller than the size of the pores or distance between fibers, and they are not able to filter out dissolved matter or liquids at all.

One example of a filtering system using such simple mechanical filters is described in U.S. Pat. No. 4,606,821 (D'Imperio), in which the primary goal is to provide a filter compartment as an integral part of the aquarium so as to be as inconspicuous as possible. In order to provide at least limited chemical treatment of the aquarium water, denitrification bacteria are provided on the surface of gravel which covers the bottom of the aquarium as a layer. Simple mechanical filters are also used in the system disclosed in U.S. Pat. No. 4,684,462 (Augustyniak), which is primarily concerned with providing a device for maintaining a constant water level in the aquarium, and also provides prefiltering.

A system for rapid filtration of particulate matter from large amounts of water such as in fish hatcheries is described in U.S. Pat. No. 4,043,299 (Birkbeck). This system further illustrates the use of sand, granite, glass beads and other media which are themselves particulate in order to remove particulate impurities from water. In particular, it illustrates the need to alleviate the problem of clogging due to accumulation of solids, which is a weakness common to all purely mechanical filter systems. For its part, the Birkbeck device is provided with means for backwashing at least one of its filters by moving it vigorously, and requires an air blower.

The tendency of many solid impurities, in particular, paint, to float on water is exploited in the device described in U.S. Pat. No. 4,585,557 (Turnquist). This device, which is intended for use in industrial paint spray booths, utilizes a weir, and a baffle at the entrance to a take-off chamber, to concentrate, separate and skim paint from the surface of run-off water and thus to remove the waste paint. The device is not intended and is therefore unable to remove sub-surface or dissolved impurities.

One method for removing dissolved organic impurities such as proteins is commonly known as protein skimming, froth floatation, froth filtration or froth fractionizing. According to this method, the water to be cleansed is caused to flow in the presence of a stream of air bubbles, whereby the dissolved or fine particulate impurities may attach themselves to and be carried along with the bubbles. In some of the prior systems, the air bubbles may flow in the same direction as the water flow, and in other systems, counter flow may occur. When the bubbles reach the surface of the water, the impurities collect as a foam and may be skimmed off. The foam is typically discarded as a waste product. Furthermore, the bubbles help to aerate the water as they pass through it. This incidental aeration is particularly beneficial when the water is used to support marine life.

One known industrial filtration device which utilizes froth filtration is described in U.S. Pat. No. 3,775,311 (Mook). In this apparatus, air is mixed with effluent, which is broken up upon passage through a screen panel. In order to accomplish this, the device requires an electric motor to drive a rotating screen cage, which acts as a centrifugal blower. The device is designed for handling large amounts of waste water, in particular effluent waste water received from sewers; it is ill-suited for use in aquariums, in which maintaining a high level of water purity is of much greater importance than treating large water volumes.

A smaller scale frothing filter for use in aquariums is described in U.S. Pat. No. 4,333,829 (Walther). A primary objective of this device, referred to as "inlet means", is to allow it to adapt itself to changing water levels in the aquarium, so as to insure intake of water only from the surface. A second objective is to make the device as small as possible so that it may be placed directly in the aquarium. In order to accomplish these goals, the device comprises two telescopically arranged tubes—a float tube and a water discharge tube—which, while maintaining a good seal, must be able to move relative to one another.

Accordingly, the object of the present invention is to provide an aquarium filter requiring minimal maintenance, which removes from the aquarium water not only solid particulates but also dissolved organic impurities such as proteins. This is accomplished primarily in a prefilter using both mechanical filter elements and protein skimming, further filtration being accomplished in a subsequent secondary filter stage.

An additional object of the invention is to provide a filtration system which, to a much greater extent than existing aquarium filtration systems, forms a closed ecological system. In particular, the protein froth created in the prefilter is used to feed an arobic denitrification bacteria which in turn are used to reduce greatly the rate of build-up of nitrate in the aquarium water and consequently the frequency of necessary water changes.

SUMMARY OF THE INVENTION

In accordance with one aspect of the invention, an aquarium water filtration means includes intake means for aquarium water, prefilter means, and water transfer means for transferring aquarium water from the intake means to the prefilter means. Both mechanical and froth filtration of the aquarium water is carried out in the prefilter, which comprises a plurality of chambers separated by walls of different heights. The aquarium water is gravity fed into and through the prefilter, and between the various chambers of the prefilter, its flow being determined by the relative heights of the separating walls, as well as by the heights of openings in certain of the walls.

In accordance with another aspect of the invention, the water filtration means described above is included in a filtration system, whereby water prefiltered by the prefilter means is drained to a secondary, downstream filter, and froth created by the froth filtration of the prefilter means is liquified and drained to an anaerobic chamber containing denitrification bacteria. Water thus filtered by the secondary, downstream filter is returned to the aquarium.

DETAILED DESCRIPTION

Figure 1:
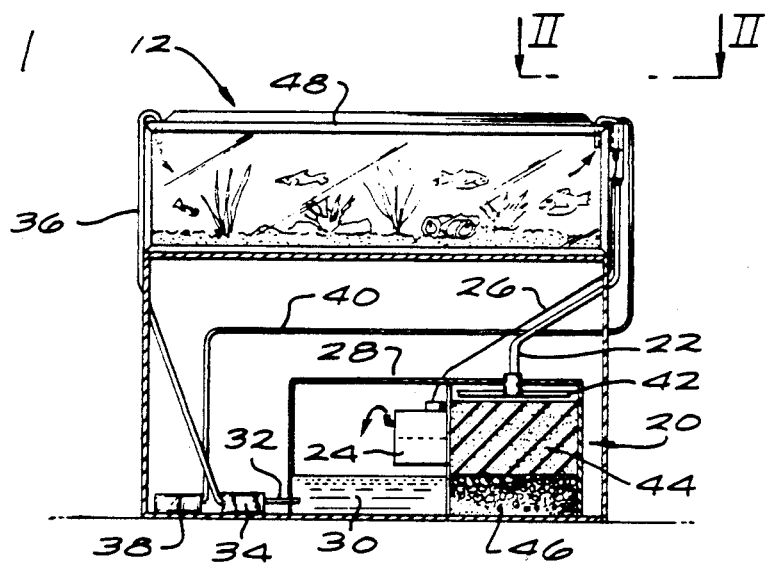
FIG. 1 shows a side view of an aquarium provided with a filter according to the invention.

Referring more particularly to the drawings, FIG. 1 shows a conventional aquarium, which is indicated generally using the reference numeral 12. A skimmer box 14 is mainly immersed in the aquarium and communicates with a prefilter 16 via siphon tubes 18. The skimmer box and prefilter are preferably manufactured of plexiglass or some other durable, easily cleaned material. The prefilter communicates in turn with a secondary, downstream filter 20 via a drainage tube 22 for prefiltered water, and with an anaerobic chamber 24 via a scum line 26. The secondary, downstream filter 20 and the anaerobic chamber are contained within a housing 28, and communicate via a drip tube (not shown), through which a small amount of water flows into the anaerobic chamber. Filtered water, collected in a sump 30 within the housing 28, passes via a water pump inlet tube 32 to a water pump 34, which pumps the filtered water through a return line 36 and back into the aquarium. An air pump 38 pumps air and/or ozone to the prefilter via an air supply line 40.

The secondary, downstream filter 20 may be of a commercially available type known in the art as a "wet/dry" filter. The secondary, downstream filter includes a rotating spray arm for partially aerating the prefiltered water and for distributing it over the surface of an upper filter section 44, which for example comprises a Dacron roll or a plastic substrate supporting a so-called "bio ball" containing filtration bacteria and further oxygenating elements. Located beneath the upper filter section 44 is a lower semi-aerobic filter section 46 comprising for example layers of known particulate filter material such as sand, beads, etc., as mentioned above.

Figure 2:
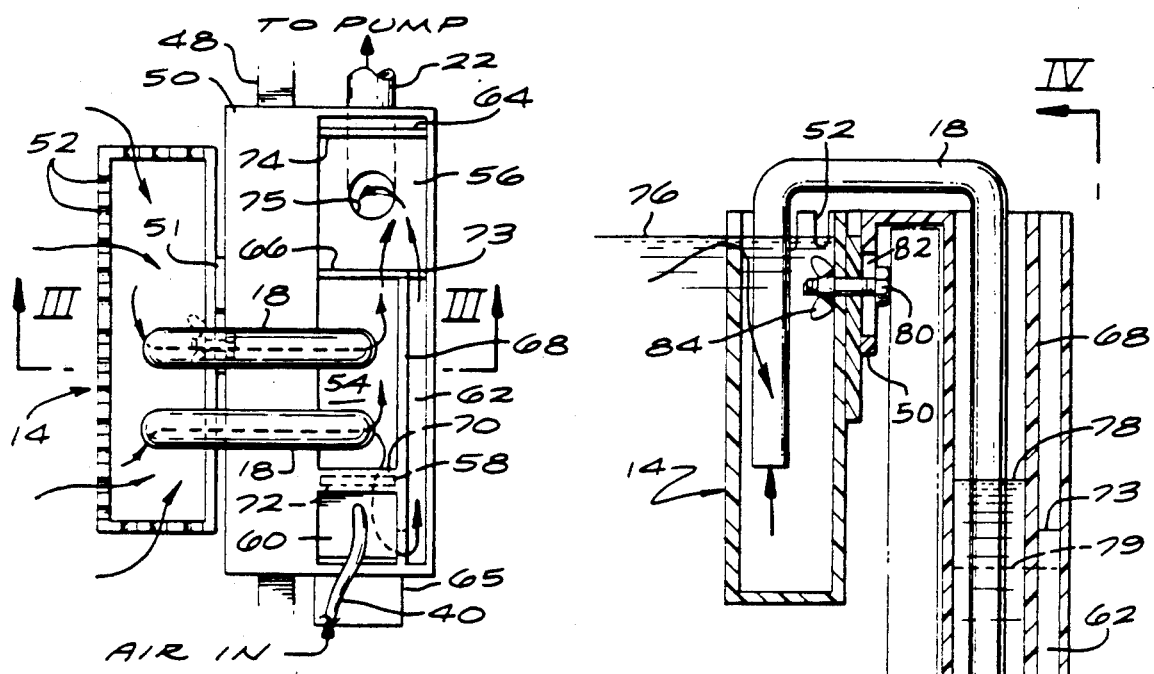
FIG. 2 shows a cross-sectional top view of a skimmer box and a prefilter, taken along the line II—II in FIG. 1.

FIG. 2 shows a top view of the skimmer box 14 and the prefilter 16, both of which are mainly upwardly open. The aquarium wall, on whose upper edge the skimmer box and prefilter are to be mounted, is indicated by reference numeral 48. A supporting ledge portion 50 of the prefilter extends over and around the edge of the aquarium wall 48 so that the prefilter may be securely hung thereon. In the illustrated embodiment, the skimmer box is constructed as a unit separate from the prefilter, and is mounted on the ledge portion 50 of the prefilter. In order to prevent lateral movement of the skimmer box when mounted, it and the ledge portion may be provided with protrusions 51 which form a mating and mutually engaging pattern. The prefilter, the skimmer box, or both may be constructed as an integral part of the aquarium itself, although this would unnecessarily limit the ability to use the invention with preexisting installations. Furthermore, the skimmer box and prefilter may themselves be constructed as a single connected unit, although this would limit the ability to adjust the skimmer box relative to the prefilter in the vertical direction.

As shown in FIG. 2, slots or indentations 52 are located in the upper edge of the skimmer box 14. In the figure, these slots are located in all the upper edges of the skimmer box except the edge adjacent to the aquarium wall. This facilitates water flow, but is not necessary; rather, the slots may be made in only one or two walls, or may be replaced entirely by a screen running around the upper edge of the skimmer box permitting aquarium water to flow into the box. The skimmer box 14 serves as a water intake from the surface of the aquarium water into the filtration system, and it also screens out large objects, e.g. fish. The size of the skimmer box will depend on the desired rate of water intake.

FIG. 2 shows further that the prefilter 16 is partitioned into a collection chamber 54, an outlet filter chamber 56, a collection channel 58, a frothing chamber 60, a skimmed water exit channel 62, an overflow channel 64, and is provided with a scum collection chamber or box 65. A first partitioning wall 66 mainly separates the collection chamber 54 from the outlet filter chamber 56; arrows extending across this wall indicate, however, that water is allowed to flow across it, as will be explained in greater detail below. Water flow from the collection chamber 54 and the collection channel 58 to the skimmed water exit channel 62 is prevented by a second partitioning wall 68, which also mainly separates the frothing chamber 60 from the skimmed water exit channel 62. The collection channel 58 is mainly separated from the collection chamber 54 by a third partitioning wall 70, and from the frothing chamber 60 by a fourth partitioning wall 72. A fifth partitioning wall 73 mainly separates the skimmed water exit channel 62 from the outlet filter chamber 56. The upper edge of the first partitioning wall 66 is located above the upper edge of the fifth partitioning wall 73.

Preferably, the first and the fifth partitioning walls are made as a single wall, whereby the difference in vertical extension is created by cutting away that portion of the wall located between the skimmed water exit channel and the outlet channel. The outlet filter chamber 56 is mainly separated from the overflow channel 64 by an overflow wall 74, which extends from a level above the bottom of the outlet filter chamber to a height between that of the first partitioning wall 66 and that of the fifth partitioning wall 73. The flow of water to and from the various chambers and channels of the prefilter will be described below.

FIG. 2 also shows that the siphon tubes 18 lead water from the skimmer box to the collection chamber 54 of the prefilter. The illustrated embodiment includes two siphon tubes as an example, but the number of tubes may be varied according to the required rate of flow of water into the prefilter. If a skimmer box is not used, aquarium water may be pumped or otherwise led directly into the collection chamber. The air supply line 40 leads into the frothing chamber 60, and water exits the prefilter and enters the drainage tube 22 via a drainage hole 75 in the bottom of the outlet filter chamber 56. In order to prevent lateral movement of the skimmer box 14 when secured to the supporting ledge portion 50, mating protrusions 51 are preferably provided on each.

Figure 3:
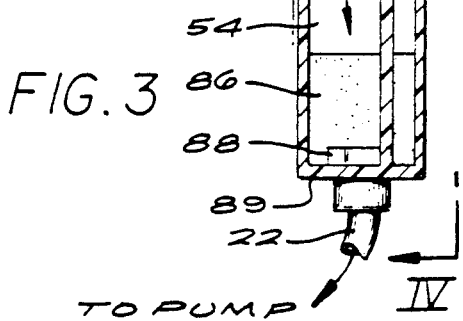
FIG. 3 shows a cross-sectional side view of the skimmer box and prefilter, taken along the line III—III in FIG. 2.
Figure 4:
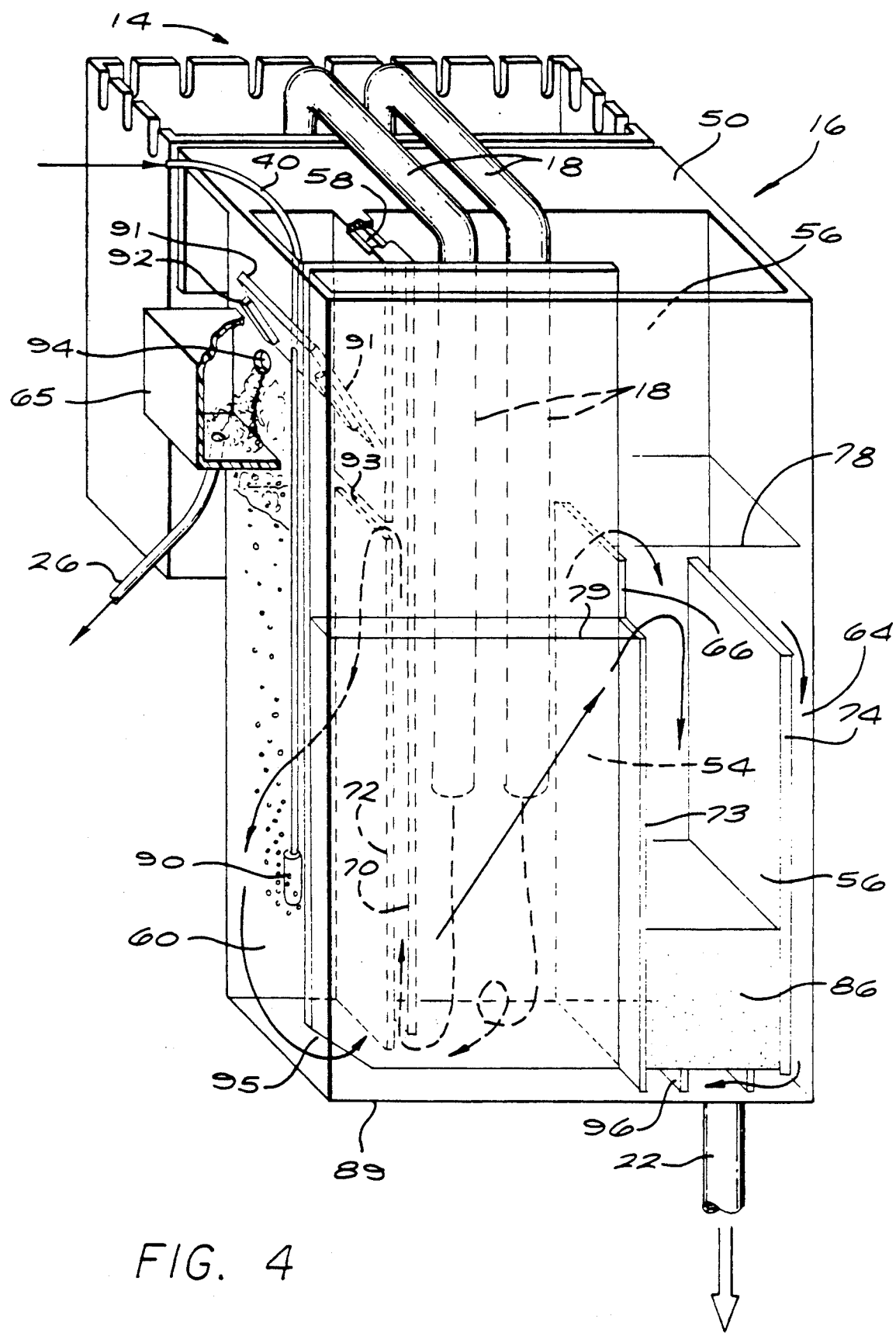
FIG. 4 shows a partially cut-away sectional side view of the prefilter, taken along the line IV—IV in FIG. 3.

FIG. 3 shows the skimmer box and prefilter from the side. The water level of the aquarium is indicated by reference numeral 76. First and second water levels in different sections of the prefilter are indicated by reference numerals 78 and 79, respectively. Incidentally, the reference numeral 73 (see FIGS. 3 and 4) refers to a wall, as best shown in FIG. 4, discussed below. In the illustrated embodiment, the skimmer box is secured to the ledge portion 50 of the prefilter by means of a plastic bolt 80 which extends through a vertical slit 82 in the ledge portion and by means of a plastic wing nut 84 which tightens down on the bolt. Plastic washers may also be included on the bolt. The width of the vertical slit 82 is less than the minimum diameter of the head of the bolt, so that the skimmer box may be adjusted vertically before tightening the wing nut. The vertical position of the skimmer box is chosen so that aquarium water will flow into the skimmer box only via the slots 52. This ensures that the water level in the skimmer box will always be substantially the same as the aquarium water level, and that the water admitted to the skimmer box, and thus to the prefilter, is taken primarily from the surface of the aquarium. The slots also prevent relatively large objects, in particular the fish themselves, from entering the skimmer box. Other securing means than the bolt and wing nut may of course be used.

As shown in FIG. 3, one or more conventional filter pads 86, for example, comprising filter floss, may if desired optionally be positioned at the bottom of the outlet filter chamber 56. For the sake of simplicity, only one filter pad is shown in the figures. In order to minimize leakage, the drainage tube 22 is connected to the outlet filter chamber by means of a tightly sealing plastic drainage plug 88. The uppermost edge of the first partitioning wall 66 terminates in the prefilter at a vertical level below the aquarium water level 76, so that the first prefilter water level 78 also will be lower than the aquarium water level 76; this enables and promotes the siphoning ability of the siphon tubes 18, whose one end extends below the aquarium water level in the skimmer box and whose other end extends below the first prefilter water level.

FIG. 4 illustrates more clearly the shape and separation of the various chambers and channels in the prefilter, as well as additional elements and features of the preferred embodiment. In FIG. 4, the bottom wall of the prefilter is indicated by the reference numeral 89. As is shown in the figure, the air supply line 40 terminates in an air outlet element 90. The purpose of the air outlet element is to create a column of small air bubbles in the frothing chamber 60. The air outlet element, often referred to in the art as an "air stone", preferably consists of balsa wood or some other porous material.

A froth deflection plate 91 is positioned at an angle so that its underside faces the scum collection chamber 65 in the upper region of the frothing chamber, preferably resting securely on plate supports 92. The deflection plate substantially seals the upper region of the frothing chamber. As is shown in FIG. 4, the air supply line 40 passes through and is securely connected to the deflection plate 91. In this way, not only is the extension of the air supply line into the frothing chamber fixed when the deflection plate is mounted against its supports 92, it also enables the air supply line, the air outlet element, and the deflection plate itself, to be removed easily for replacement or cleaning.

FIG. 4 illustrates in particular the relative vertical extension of the various walls, channels and openings relative to the water levels 78, 79 in the prefilter. The first water level 78 is determined by and approximately equal to the level of the upper edge of the first partitioning wall 66 and the second water level 79 is determined by and approximately equal to the level of the upper edge of the fifth partitioning wall 73. A first aperture 93, formed in and preferably extending across the width of the fourth partitioning wall 72, extends below the prefilter water level 78. The collection channel 58 and the frothing chamber 60 thus communicate via the first aperture 93. The upper extension of the first aperture shown in FIG. 4 is approximately at or slightly above the level of the first water level 78; this is, however, not essential to the invention, as is explained in greater detail below.

A froth outlet aperture 94 is located in one side wall 95 of the prefilter which preferably also forms one wall of the frothing chamber 60. The froth outlet aperture is disposed approximately at the height of the center of the deflection plate 91 when the plate is mounted in the frothing chamber. The frothing chamber 60 and the scum collection chamber or box 65 thus communicate via the froth outlet aperture 94.

The frothing chamber 60 and the skimmed water exit channel 62 communicate via a second aperture 95 formed at the bottom of the second partitioning wall 68. As FIG. 4 shows, the second aperture may be formed easily by cutting away a corner of the second partitioning wall. The second aperture 95 should preferably be made sufficiently small that the rate of flow of water into the frothing chamber will be greater than the rate of flow of water from the frothing chamber to the exit channel 62. When mounted in the outlet filter chamber 56, the filter pad 86 rests against filter pad supports 96 so that there is vertical clearance between the bottom of the outlet filter chamber, i.e., the bottom wall 89 of the prefilter, and the bottom of the filter pad.

As seen in FIG. 4, there is vertical clearance between the bottom wall 89 of the prefilter and the bottom edge of the third partitioning wall 70; water may therefore flow freely from the collection chamber 54, under the third partitioning wall, and into the collection channel 58. Alternatively, the third partitioning wall may extend all the way to the bottom wall 89, as long as an aperture is provided near the bottom of the third wall to allow direct fluid communication between the collection chamber and the collection channel. The figure illustrates the previously mentioned vertical clearance between the bottom of the overflow wall 74 and the bottom wall 89 of the prefilter, and also that the upper edge of the overflow wall is located at a vertical level between that of upper edges of the first and fifth partitioning walls 66 and 73, respectively. Water may therefore flow freely between the outlet filter chamber and the overflow channel both above and below the overflow wall.

The flow of water into, within and out of the prefilter 16, indicated generally by arrows, will now be described with continued reference to FIG. 4. At the same time, the filtering operation of the prefilter and certain alternative embodiments of the prefilter will also be made clear.

As explained above, aquarium water enters the collection chamber 54 from the skimmer box 14 via the siphon tubes 18. The siphoning action is started in a conventional manner. The use of siphoning tubes has the advantage that water is continuously transferred to the prefilter without the need for a separate energy-consuming pump. Because the collection chamber 54 and the collection channel 58 communicate under the third partitioning wall 70, the levels of water in both the chamber and channel will be the same as they initially fill. The water levels in the collection chamber and collection channel continue to rise at equal levels until they reach the first water level 78, whereupon water begins to flow over the first partitioning wall 66 from the collection chamber 54 into the outlet filter chamber 56, and through the first aperture 93 from the collection channel 58 into the frothing chamber 60. This is the steady-state condition for the collection chamber 54 and the collection channel 58.

FIG. 4 illustrates the necessity of forming the first aperture so that its bottom edge is at or, preferably, slightly below the level of the upper edge of the first partitioning wall 66. If the aperture were situated wholly above the level of the first partitioning wall, all or almost all of the water in the collection chamber would flow into the output chamber 86. As an alternative, the first aperture 93 may be located mainly or wholly below the level of the upper edge of the first partitioning wall 66. In this case, depending on the width of the aperture and the flow rate of water into the collection chamber, most or all of the water would flow into the frothing chamber 60. Locating the first aperture 93 as high as possible, however, ensures the greatest possible counter-current in the frothing chamber and maximizes the interaction time between the water and the bubbles.

If the flow of water into the prefilter is greater than is able to pass through the first aperture, the water level in the collection chamber 54 will continue to rise until it is above the level of the upper edge of the first partitioning wall 66, whereupon water would once again flow into the outlet filter chamber 56. For this reason, the third and fourth partitioning walls 70 and 72, respectively, preferably extend above the first water level 78.

As water flows through the first aperture 93 from the collection channel 58 the frothing chamber 60 begins to fill. Since the second aperture 95 is sufficiently small that the rate of flow of water into the frothing chamber will be greater than the rate of flow of water from the frothing chamber to the exit channel 62, the frothing chamber will fill until the water level mainly reaches the first water level 78. The water level in the exit channel 62 will rise until it reaches the second prefilter water level 79, whereupon water begins to flow over the fifth partitioning wall 73 from the exit channel 62 into the outlet filter chamber 56. This is the steady-state condition for the frothing chamber 60 and the skimmed water exit channel 62.

Water thus enters the outlet filter chamber 56 both over the first and fifth partitioning walls, 66 and 73, respectively. Initially, water will pass through the filter pad 86 and fill the bottom of the outlet filter chamber until it runs out through the drainage plug 88, the drainage hole 75, and onward into the drainage tube 22, through which it is removed to further components of the filtering system according to the present invention. If the filter pad becomes clogged, so that the flow of water into the outlet filter chamber is greater than can pass through the filter pad and exit the chamber, the water level in the outlet filter chamber will begin to rise. It will continue to rise until it reaches the level of the upper edge of the overflow wall 74, at which point the water will flow into and down the overflow channel 64, thus bypassing the filter pad 86, and freely out via the open space created between the bottom wall 89 and the bottom of the filter pad, finally exiting the outlet filter chamber through the drainage plug and hole.

In order to prevent any possibility of filter pad clogging leading to a total stoppage of water flow in the prefilter, the upper edge of the overflow wall 74 must be located below, and preferably well below, the first aperture 93 and the upper edge of the first partitioning wall 66. If water rising in the outlet chamber due to clogging of the filter pad is not a potential problem, or if no filter pad is included, the overflow wall and channel, as well the filter pad supports 96, may be excluded from the prefilter.

The prefilter 16 according to the present exemplifying embodiment of the invention provides two types of filtration of the aquarium water. Conventional filtration of solid, particulate matter is provided by the filter pads 86, which may consist of any desired or suitable materials. The positioning of the filter pads in the outlet chamber 56 makes it easy to inspect, remove, and replace them.

Dissolved organic impurities such as proteins, as well as very small particulates, are filtered out of the water in the frothing chamber 60. In operation, air, ozone, or any other desired gas or combination of gasses is pumped through the air supply line 40, and is delivered to the frothing chamber as a column of fine bubbles by means of the inlet element 90. As these bubbles rise to the surface of the water in the frothing chamber, the dissolved organic impurities, such as proteins, as well as the very small particulates, attach themselves to the surface of the bubbles and rise with them to the surface. Once at the surface of the water, the bubbles burst, leaving a froth-like substance consisting of the impurities.

As the froth accumulates above the surface of the water in the frothing chamber, it is forced through the froth outlet aperture 94 by the deflection plate 91, and thus into the scum collection chamber or box 65. As water enters and descends into the frothing chamber 60 through the first aperture 93, a counter-current is created in the chamber between the gas bubbles and the water flowing into the frothing chamber. This counter-current leads to a greater contact time during which impurities may attach themselves to the bubbles, thereby improving the froth filtration ability of the device.

The prefiltered water which exits the outlet filter chamber 56 drains down through the drainage tube 22 to the secondary, downstream filter 20. There, the water is filtered additionally as it passes through the upper and lower filter sections 44 and 46, respectively, and runs off into the filtered water sump 30. The filtered water is then pumped by the water pump 34 and returned to the aquarium via the water return line 36.

Referring now to FIG. 1, once in the scum collection chamber 65, the froth will liquify and drain down through the scum line 26 to the anaerobic chamber 24. Anaerobic denitrification bacteria contained in the anaerobic chamber 24 feed on the scum, for energy to convert nitrates to nitrogen gas. The nitrates in the water are passed from the upper filter section 44 to chamber 24 via the drip tube. The product of the bacteria is harmless nitrogen gas, which may be released directly into the atmosphere. The small amount of run-off water remaining in the froth is allowed to drain into the filtered water sump 30. One should note that, ordinarily, systems incorporating denitrification bacteria require the user to maintain a certain amount of sugar in the anaerobic chamber in order to feed the bacteria, and the froth from protein skimming is discarded. The present invention therefore not only utilizes the protein froth, thus minimizing waste and creating a more closed ecological system, it also frees the user from the necessity of replenishing sugar or other food substances for the bacteria. Other known means for treating the froth may of course be used.

As will be appreciated from the above discussion, the aquarium 12—prefilter 14—secondary filter 20 system forms a mainly closed purification system which produces no waste water and which requires no chemical additives which must be periodically cleaned out and replenished. In the prefilter, most particulate impurities are eliminated either through frothing or by being trapped by the filter pads 86, and the rate of increase of the concentration of nitrate impurities in the aquarium water will be greatly reduced by the froth creation and removal process in the frothing chamber 60 for each passage of a volume of water through the prefilter and the secondary filter. The prefilter therefore significantly reduces the burden placed on the secondary, downstream filtration system, enabling it to work more efficiently. Furthermore, since intake of water from the aquarium, transfer of the water to the prefilter, and movement of the water from the prefilter to the secondary, downstream filter stage all are effected by gravity alone, no additional pumps are required.

One advantageous feature of the embodiment described above and illustrated in the drawings is that it may be made narrow so as to be unobtrusive when mounted over the edge of an existing aquarium. This is best seen in FIG. 1. The relative location of the various chambers and channels in the prefilter may, however, be changed to better suit a different application. For example, if only froth filtration is required, the outlet prefilter chamber 56 made be made much smaller as long as the drainage hole allows sufficiently rapid drainage. Viewed as in FIG. 2, by moving the fifth partitioning wall 73 down so that it is approximately in line with the third or fourth partitioning wall 70, 72 respectively, the outlet chamber could be located so that it is separated from the collection chamber 54 by the second instead of the first partitioning wall. In this case, a portion of the second partitioning wall would need to be cut away so that the upper edge of the portion would be equal to and would replace the first partitioning wall.

In the illustrated exemplifying embodiment, water flows between certain chambers by flowing over or under intermediate partitioning walls. The same result could of course also be achieved by allowing the walls to extend all the way to the bottom wall or higher than described and by providing apertures in the walls at the corresponding heights.

In cross section, the chambers and channels of the prefilter in the illustrated embodiment are mainly rectangular. This choice enables the prefilter to be easily manufactured of rectangular plates, and it allows the prefilter to lie flush and inconspicuously against one wall of the aquarium; the rectangular shape, however, is not essential to the invention. In particular, the prefilter could also be shaped as a cylinder to enable it to be mounted, for example, above the secondary, downstream filter housing 28. In this case, the outer peripheral cylindrical wall of the prefilter would correspond to the four outer walls of the prefilter as shown in the drawings. The chambers and channels of the prefilter could then be formed as concentric cylindrical or semi-cylindrical sections separated by radial or cylindrical walls.

It is understood that the foregoing description relates to an illustrative embodiment of the invention. Various changes may be made without departing from the spirit and scope thereof. Thus, by way of example and not of limitation, the system may be closed and operate on fluid pressure provided by a pump, for example, with flow being controlled by the size and positioning of openings between the chambers. Accordingly, the present invention is not limited to the specific configuration as shown in the drawings and described hereinabove.

What is claimed is:

1. Aquarium water filtration means including intake means for aquarium water, prefilter means, and water transfer means for transferring aquarium water from the intake means to the prefilter means, the prefilter means comprising:

a collection chamber for receiving aquarium water from the intake means;

an outlet filter chamber including:
mechanical filter means;
drainage means for drainage of prefiltered water from the prefilter means;
an overflow wall separating the mechanical filter means from an overflow channel for channelling overflow water in the outlet filter chamber to bypass the mechanical filter means;

a collection channel; a frothing chamber;

froth collection means;

a skimmed water exit channel;

a first partitioning wall, mainly separating the collection chamber from the outlet filter chamber and extending from a bottom wall of the prefilter means to a first level, whereby the collection chamber and the outlet filter chamber communicate via a first opening located at or above said first partitioning wall for allowing water to flow from the collection chamber to the outlet filter chamber at or above the first level;

a third partitioning wall, mainly separating the collection chamber from the collection channel and extending above the first level, whereby the collection chamber and collection channel communicate via a third opening located at the bottom of said third partitioning wall;

a fourth partitioning wall, mainly separating the collection channel from the frothing chamber and extending above the first level, whereby the collection channel and frothing chamber communicate via a fourth opening, extending below the first level, provided in the fourth partitioning wall;

a second partitioning wall, separating the collection chamber from the skimmed water exit channel and mainly separating the frothing chamber from the skimmed water exit channel, whereby the frothing chamber and the skimmed water exit channel communicate via a second opening located at the bottom of the second partitioning wall;

a fifth partitioning wall, mainly separating the skimmed water exit channel from the outlet filter chamber and extending from the bottom wall of the prefilter means to a second level, lower than the first level, whereby the skimmed water exit channel and the outlet filter chamber communicate via a fifth opening located at or above said fifth partitioning wall for allowing water to flow from the skimmed water exit channel to the outlet filter chamber at or above the second level;

frothing means for creating a vertical stream of gas bubbles in the frothing chamber counter to the flow of water into the frothing chamber for froth filtration of the water entering the frothing chamber from the collection channel; gas supply means for supplying frothing gas to the frothing means;

froth separation means disposed in the frothing chamber for removing froth created by the frothing means; and said froth collection means constituting means for collecting and removing froth created by the frothing means from the prefilter means.

2. Aquarium water filtration means including:

intake means for aquarium water, prefilter means, water transfer means for transferring aquarium water from the intake means to the prefilter means, said prefilter means provided for both froth filtration and mechanical filtration of the aquarium water and comprising side walls, a plurality of chambers separated by partitioning walls, and means for permitting fluid flow between said chambers;

said prefilter means including means for the feeding of said aquarium water into and through the prefilter means;

said prefilter means comprising:

(a) a collection chamber for receiving aquarium water from the intake means;

(b) mechanical filter means for mechanical filtration of the aquarium water;

(c) froth filtration means for froth filtration of the aquarium water; and (d) drainage means for drainage of aquarium water filtered by the mechanical filter means and the froth filtration means from the prefilter means; and said prefilter means also including:

(a) an outlet filter chamber containing said mechanical filter means and said drainage means;

(b) a collection channel;

(c) a frothing chamber;

(d) a skimmed water exit channel;

(e) a first, a second, a third, a fourth, and a fifth opening comprising said means for permitting fluid flow;

(f) a first partitioning wall, mainly separating the collection chamber from the outlet filter chamber and extending from a bottom wall of the prefilter means to at least a first level, whereby the collection chamber and the outlet filter chamber communicated via said first opening, located in or above the first partitioning wall, for allowing water to flow from the collection chamber to the outlet filter chamber at or above the first level;

(g) a third partitioning wall, mainly separating the collection chamber from the collection channel and extending above the first level, whereby the collection chamber and collection channel communicate via said third opening, located in or below the bottom of said third partitioning wall;

(h) a fourth partitioning wall, mainly separating the collection channel from the frothing chamber and extending above the first level, whereby the collection channel and frothing chamber communicate via said fourth opening, located in said fourth partitioning wall and extending below the first level, for creating a counter-current of water in the frothing chamber;

(i) a second partitioning wall, separating the collection chamber from the skimmed water exit channel and mainly separating the frothing chamber from the skimmed water exit channel, whereby the frothing chamber and the skimmed water exit channel communicate via said second opening, provided at or below the bottom of the second partitioning wall;

(j) a fifth partitioning wall, mainly separating the skimmed water exit channel from the outlet filter chamber and extending from the bottom wall of the prefilter means to at least a second level, lower than the first level, whereby the skimmed water exit channel and the outlet filter chamber communicate via said fifth opening located in or above said fifth partitioning wall for allowing water to flow from the skimmed water exit channel to the outlet filter chamber at or above the second level; and (k) frothing means for crating a vertical stream of gas bubbles in the frothing chamber for froth filtration of water entering the frothing chamber from the collection channel, whereby said counter-current of water flows counter to said vertical stream of gas bubbles;

(l) froth separation means disposed in the frothing chamber for removing froth created by the frothing means; and (m) froth collection means for collecting and removing froth created by the frothing means from the prefilter means.

3. Filtration means as defined in claim 2, in which the frothing means is removable and includes a gas supply line extending below the second level and provided with an air diffuser for dispersing supplied gas as said stream of gas bubbles.

4. Filtration means as defined in claim 2, in which said froth separation means comprises a deflection plate for mainly sealing the frothing chamber and for deflecting said froth into said froth collection means.

5. Filtration means as defined in claim 4, in which said froth collection means communicates with the frothing chamber via a froth outlet aperture in a side wall of the prefilter means.

6. Filtration means as defined in claim 2, in which a drainage interspace is provided between the bottom of said mechanical filter and said drainage means, and in which said outlet filter chamber includes:

an overflow wall extending vertically above and below said mechanical filter means and disposed laterally between said mechanical filter means and an overflow channel, said overflow channel providing direct communication between said drainage means and the region in the outlet filter chamber above the upper edge of the overflow wall, bypassing said mechanical filter means.

7. Filtration means as defined in claim 2, in which said mechanical filter means comprises filter pads.

8. Filtration means as defined in claim 2, in which the bottom and side walls of the prefilter means, as well as all said partitioning walls, are mainly rectangular.

9. Filtration means as defined in claim 7, in which said intake means and said prefilter means are made of transparent plastic.

10. Aquarium water filtration system including:
intake means for aquarium water,
prefilter means, and
water transfer means for transferring aquarium water from the intake means to the prefilter means,
said prefilter means comprising: a collection chamber for receiving aquarium water from the intake means;
mechanical filter means for mechanical filtration of the aquarium water;
froth filtration means for froth filtration of the aquarium water; and
drainage means for drainage of aquarium water filtered by the mechanical filter means and the froth filtration means from the prefilter means;
secondary filter means including a plurality of secondary filter elements, as well as an anaerobic chamber containing denitrification bacteria for partial denitrification of water in the secondary filter means;
froth collection means for collecting and removing froth created by the frothing means from the prefilter means;
a scum line for transferring liquified froth from the froth collection means to the anaerobic chamber for feeding said denitrification bacteria;
a drainage line for removing water from said drainage means to said secondary filter elements;
a water pump for returning filtered water from the secondary filter means to the aquarium.

11. Filtration system as defined in claim 10, in which the prefilter means includes:
an outlet filter chamber containing said mechanical filter means and said drainage means;
a collection channel;
a frothing chamber;
a skimmed water exit channel;
a first partitioning wall, mainly separating the collection chamber from the outlet filter chamber and extending from a bottom wall of the prefilter means to a first level, whereby the collection chamber and the outlet filter chamber communicate via a first opening located in or above the first partitioning wall for allowing water to flow from the collection chamber to the outlet filter chamber at or above the first level;
a third partitioning wall, mainly separating the collection chamber from the collection channel and extending above the first level, whereby the collection chamber and collection channel communicate via a third opening located in or below the third partitioning wall;
a fourth partitioning wall, mainly separating the collection channel from the frothing chamber and extending above the first level, whereby the collection channel and frothing chamber communicate via a fourth opening provided in said fourth partitioning wall and extending below the first level;
a second partitioning wall, separating the collection chamber from the skimmed water exit channel and mainly separating the frothing chamber from the skimmed water exit channel, whereby the frothing chamber and the skimmed water exit channel communicate via a second opening provided at or below the bottom of the second partitioning wall;
a fifth partitioning wall, mainly separating the skimmed water exit channel from the outlet filter chamber and extending from the bottom wall of the prefilter means to a second level, lower than the first level, whereby the skimmed water exit channel and the outlet filter chamber communicate via a fifth opening located in or above the fifth partitioning wall for allowing water to flow from the skimmed water exit channel to the outlet filter chamber at or above the second level; and
frothing means for creating a vertical stream of gas bubbles in the frothing chamber for froth filtration of water entering the frothing chamber from the collection channel;
froth separation means disposed in the frothing chamber for removing froth created by the frothing means.

* * * * *